United States Patent
Sattler et al.

(10) Patent No.: US 12,083,664 B2
(45) Date of Patent: Sep. 10, 2024

(54) METHOD FOR DETECTING A SLIP CLUTCH RELEASE EVENT, AND POWER TOOL

(71) Applicant: Hilti Aktiengesellschaft, Schaan (LI)

(72) Inventors: Christian Sattler, Biessenhofen (DE); Marco Balter, Feldkirch (AT); Frank Fritsch, Kaufering (DE)

(73) Assignee: Hilti Aktiengesellschaft, Schaan (LI)

( * ) Notice: Subject to any disclaimer, the term of this patent is extended or adjusted under 35 U.S.C. 154(b) by 347 days.

(21) Appl. No.: 17/621,920

(22) PCT Filed: Jun. 17, 2020

(86) PCT No.: PCT/EP2020/066781
§ 371 (c)(1),
(2) Date: Dec. 22, 2021

(87) PCT Pub. No.: WO2020/260093
PCT Pub. Date: Dec. 30, 2020

(65) Prior Publication Data
US 2022/0274244 A1    Sep. 1, 2022

(30) Foreign Application Priority Data
Jun. 27, 2019    (EP) .................................. 19182950

(51) Int. Cl.
*B25F 5/00* (2006.01)
*B23B 49/00* (2006.01)
(Continued)

(52) U.S. Cl.
CPC .............. *B25F 5/001* (2013.01); *B23B 49/00* (2013.01); *B23Q 17/0961* (2013.01);
(Continued)

(58) Field of Classification Search
CPC .............................. B25F 5/001; G01M 13/022
See application file for complete search history.

(56) References Cited

U.S. PATENT DOCUMENTS

| 5,738,177 A | * | 4/1998 | Schell ..................... B25B 23/14 |
| | | | 173/181 |
| 7,011,165 B2 | | 3/2006 | Kristen et al. |

(Continued)

FOREIGN PATENT DOCUMENTS

| CN | 1321568 A | 11/2001 |
| CN | 2525501 Y | 12/2002 |

(Continued)

OTHER PUBLICATIONS

Translation for Sattler EP 3292969 (Year: 2024).*
PCT/EP2020/066781, International Search Report dated Oct. 2, 2020 (Two (2) pages).

*Primary Examiner* — Lucas E. A. Palmer
(74) *Attorney, Agent, or Firm* — Crowell & Moring LLP (57) ABSTRACT

A method for detecting whether a slip clutch release event has taken place in a power tool includes determining a first speed of a gear device by a first sensor, determining a second speed of a motor by a second sensor, and determining a current value by a third sensor. The method further includes determining a state of the power tool by using the first and second speeds and the current value, determining a state of the gear device in dependence on the current value by a control device, ascertaining a state of activity of the slip clutch in dependence on the first and second speeds by the control device, and ascertaining by the control device by a combination of the state of the gear device and the state of activity of the slip clutch whether the slip clutch release event has taken place.

7 Claims, 3 Drawing Sheets

(51) Int. Cl.
*B23Q 17/09* (2006.01)
*B23Q 17/10* (2006.01)
*G01M 13/022* (2019.01)

(52) U.S. Cl.
CPC ........... *B23Q 17/10* (2013.01); *G01M 13/022* (2013.01); *B23B 2226/75* (2013.01); *B23B 2260/07* (2013.01); *B23B 2260/128* (2013.01); *B23B 2270/486* (2013.01)

(56) References Cited

U.S. PATENT DOCUMENTS

| | | | |
|---|---|---|---|
| 8,708,861 B2 | 4/2014 | Inagaki et al. | |
| 9,889,548 B2 | 2/2018 | Sattler | |
| 10,377,005 B2 | 8/2019 | Sattler | |
| 2003/0221928 A1* | 12/2003 | Koslowski | B25F 5/001 192/56.4 |
| 2011/0127941 A1* | 6/2011 | Hirabayashi | B25F 5/001 318/476 |
| 2013/0186661 A1* | 7/2013 | Okubo | B25F 5/00 173/2 |
| 2013/0269961 A1* | 10/2013 | Lim | B25F 5/001 173/1 |
| 2013/0333904 A1 | 12/2013 | Raggl et al. | |
| 2017/0008159 A1* | 1/2017 | Boeck | G05B 19/00 |
| 2017/0060356 A1 | 3/2017 | Oota et al. | |
| 2017/0066447 A1* | 3/2017 | Hertel | B60W 10/02 |
| 2017/0129089 A1* | 5/2017 | Manschitz | B25D 16/003 |
| 2018/0133929 A1 | 5/2018 | Drexl et al. | |
| 2018/0345433 A1 | 12/2018 | Sudo et al. | |
| 2019/0047133 A1* | 2/2019 | Beckert | B25B 23/1475 |

FOREIGN PATENT DOCUMENTS

| | | |
|---|---|---|
| CN | 102310398 A | 1/2012 |
| CN | 103507041 A | 1/2014 |
| DE | 103 48 756 A1 | 5/2005 |
| DE | 10 2011 082 988 A1 | 3/2013 |
| DE | 10 2016 010 068 A1 | 3/2017 |
| EP | 2 915 633 A1 | 9/2015 |
| EP | 2 927 186 A1 | 10/2015 |
| EP | 3 088 150 A1 | 11/2016 |
| EP | 3292969 A1 * | 3/2018 |
| HU | 231230 B1 * | 4/2022 |
| JP | 2012-76160 A | 4/2012 |
| JP | 2018-194160 A | 12/2018 |
| KR | 10-1999-0002039 A | 1/1999 |
| WO | WO 2015/132373 A1 | 9/2015 |
| WO | WO 2017/094414 A1 | 6/2017 |

\* cited by examiner

METHOD FOR DETECTING A SLIP CLUTCH RELEASE EVENT, AND POWER TOOL

BACKGROUND AND SUMMARY OF THE INVENTION

The present invention relates to a method for detecting whether a slip clutch of the power tool has released, and also to a power tool designed to perform the proposed method. For this purpose, the power tool comprises in particular a motor as a drive for the power tool, a control device, a gear device, a first sensor for sensing a first speed of the gear device, a second sensor for sensing a first speed of the motor, a third sensor for sensing current values, and also a slip clutch. In the case of the proposed method, speed and current values are used in particular to detect a release of the slip clutch.

Power tools that have mechanical slip clutches or safety clutches are known in the prior art. However, depending on how often the slip clutch or safety clutch has been released or how long the corresponding release events have lasted, these conventional power tools show great effects of abrasion and wear. Another undesirable consequence of these effects of abrasion and wear is that the release torque of the slip clutch, and consequently also the performance of the power tool as a whole, decreases over time. Among the reasons for this is that the reduced release torque causes an increasing number of release events, which has a disadvantageous effect for example on the operating time of the power tool, since the power tool cannot be used in the downtimes caused by the release of the slip clutch. It would therefore be desirable if methods by which the release of the slip clutches could be reliably detected could be provided, in order to call in for servicing devices with which for example a certain number of release events is exceeded.

Some tools or power tools are used together with an automatic feed device. Such systems are referred to for example as auto feed. If an electric power tool is used together with an automatic feed device, the automatic process controlled by the feed device may possibly not be continued in the desired way and/or be ended if a release event of the slip clutch occurs.

For example, such auto feed devices are used together with power tools that are designed as core drills. Power tools, such as for example power core drills, generally serve the purpose of cutting holes into mineral materials, such as for example concrete or brick. For this, the core drill usually includes a tool fitting and a tool, for example in the form of a drill bit. A motor drives the tool fitting together with the tool in a rotational motion via a gear device. The drill bit set in a rotational motion cuts an annular hole into the material by means of the diamond-tipped cutting edge, thereby producing a cylindrical drill core. After the drilling or cutting operation is ended, this drill core is removed from the borehole.

No reliable data on the release of the slip clutches are available so far. In particular, so far it has not been technically possible to gather, store and at a given time evaluate such data. It would however be desirable for the improvement and further development of slip clutches if such reliable data were available, in particular such data that describe the number of release events per device, the number of release events per drilled hole or the number of release events per year.

For example, DE 10 2011 082 988 A1 describes a device for controlling a power tool, in particular a power grinder, the device being intended for controlling operating functions of the power tool and for programming the power tool. The device comprises an operating panel that can be used for performing inputs in an input mask.

EP 2 927 186 A1 discloses a controller of an industrial truck with at least one graphic display device, a control device and a memory element on which information for operating and/or servicing the industrial truck is stored. Depending on an operating state, a fault that has occurred or a request that can be input into an input device, the control device may display on the display device a barcode with assigned information.

In DE 10 2016 010 068 A1, a numerical controller comprising state data is disclosed. The state data may concern a machining state or a menu element. Furthermore, in DE 10 2016 010 068 A1, a machine learning model for determining a menu element display sequence in the menu display.

The object of the present invention is therefore to overcome the disadvantages and defects of the prior art described above and to provide a method for detecting a slip clutch release event, and also a power tool performing the method. With the method, it is intended for example to make it possible to collect and evaluate reliable data on release events of the slip clutch, since a slip clutch event for the purposes of the invention is preferably considered as an event that can influence the state of the power tool. In particular, those devices or types of device in the case of which the slip clutches are released particularly frequently, or which have already reached a certain limit value of release events, are to be identified by means of the method. If, for example, certain types of device with an increased risk of release of the slip clutch can be identified, improvement work can be performed specifically with respect to this type of device. If individual devices with an increased risk of release of the slip clutch can be identified by means of the method, the owners of these devices could be requested to have their devices serviced or to take other remedial measures. The object of the invention is also in particular to provide a method for detecting a slip clutch release event on those power tools that operate together with an automatic feed device.

The object is achieved by a method for detecting whether a slip clutch release event has taken place, the power tool comprising a motor as a drive for the power tool, a control device, a gear device, a first sensor for sensing a first speed of the gear device, a second sensor for sensing a first speed of the motor, a third sensor for sensing current values, and also a slip clutch. The method is characterized by the following method steps:
  a) determining a first speed of the gear device by the first sensor,
  b) determining a first speed of the motor by the second sensor,
  c) determining a current value by the third sensor,
  d) determining a state of the power tool by using the speeds and current values sensed by the sensors,
  the control device being designed to determine a state of the gear device in dependence on the current values determined and the control device being designed to ascertain a state of activity of the slip clutch in dependence on the speed values determined, the control device ascertaining by a combination of the state of the gear device and the state of activity of the slip clutch whether a slip clutch release event has taken place.

In a most particularly preferred embodiment of the invention, the power tool is a power core drill or a core drill. The tool of the power tool may in this case be for example a drill bit. It is most particularly preferred that the proposed method is used for detecting a release event of a slip clutch of the power tool. It is particularly preferred in this connection that the power tool has a slip clutch. Method step d) may in this case mean that it is determined whether a release of the slip clutch of the power tool has taken place, the current and speed values determined by the sensors preferably also being used for this determination.

Preferably, the state of the power tool may be influenced by a release of the slip clutch of the power tool, so that conclusions as to whether or not a slip clutch release event has occurred can be drawn from the determined state of the power tool. In particular, the speed and current values that are sensed by the sensors of the power tool, preferably during its operation, are used for investigating whether a slip clutch release event has occurred. In the case where a slip clutch release event has been determined, the motor of the power tool may be switched off as a response to this or as an optional method step e). If the power tool is used together with an automatic feed device, the driving force of the feed device may be reduced as a response to a slip clutch release event. For the purposes of the invention, it may also be preferred that the feed device or the power tool is relieved substantially completely of loading. In addition, after detecting a slip clutch release event, the drill bit may be withdrawn from the borehole if the power tool is a core drill.

For the purposes of the invention, it is preferred that the slip clutch is arranged between a tool of the power tool and the motor of the power tool. If the power tool is a core drill, the slip clutch is preferably between the drill bit and the motor. In particular, the slip clutch forms a mechanical connection between the drill bit and the motor of the core drill. For the purposes of the invention, it is preferred that the slip clutch is considered to be "active" if the drill bit and the motor are rotating at substantially the same rotational speed. If the drill bit and the motor have different rotational speeds, the slip clutch is preferably considered to be "non-active". For the purposes of the invention, it is particularly preferred if the rotational speeds of the motor and the drill bit are determined by means of sensors. The sensor for determining the motor rotational speed may for example be arranged in the spatial vicinity of the motor. It may preferably be the second sensor for the purposes of the invention. The sensor for determining the rotational speed of the drill bit may for example be arranged in the spatial vicinity of the drill bit. In addition, gear sensors may be used for measuring the rotational speeds. The sensors mentioned may for example be designed as Hall sensors.

According to method step d), the state of the core drill may be determined by using the speeds and current values sensed by the sensors. The current values are determined by the third sensor, the current values being used in particular for being able to differentiate whether the gear device is idling or whether the slip clutch is active. In the context of the present invention, idling is preferably characterized in that a comparatively small current value is measured by the third sensor. In the context of the present invention, a small current value is consequently associated with the motor of the core drill not having to work very hard. The state that the slip clutch is active may preferably be detected from a comparatively great current value that is determined by the third sensor. This state is preferably associated with the motor of the core drill having to work hard. To this extent, the current values determined by the third sensor are used in particular to ascertain the state of the gear mechanism. This preferably makes it possible to draw conclusions as to whether or not the slip clutch has released. In other words, the current values can be used in particular to determine whether or not a slip clutch release event has taken place. Preferably, it is the current value that reproduces or describes an activity of the slip clutch.

In a preferred embodiment of the invention, the power tool may operate together with an automatic feed device, which is preferably designed to drive the power tool into the material to be cut. In particular together with such devices known as auto feed, the proposed method for detecting slip clutch release events has the effect that processes that are automatically controlled by the feed device can be continued in a desired way or ended once a release of the slip clutch has occurred or once such a release event has been determined by performing the proposed method. It is preferred in particular that, when a slip clutch release event is detected, the driving force of the feed device can be reduced in order to respond to the release of the slip clutch. At a later point in time, the driving force of the feed device may then be increased again, for example to the original or a different level.

In addition, the proposed method may be used to collect and evaluate information about release events. As a result, the understanding of the release of the slip clutch can be further improved and the findings obtained can be used to optimize further the underlying technology. It was surprising for those skilled in the art that speed and current values can be combined with one another and taken into consideration in a joint evaluation in such a way as to detect on a power tool whether a slip clutch has released.

The proposed method advantageously leads to an increased lifetime or service life of the slip clutch, and also to a stable performance of the power tool with short downtimes or relatively long running times. In particular, when using auto feed devices, high process completion rates can be achieved, allowing processes to be completed as planned or as desired. Tests have shown that the downtimes of the power tools that carry out the proposed method can be reduced significantly.

A further advantage of the invention is that, by detecting the release of the slip clutch, the slip clutch can be limited in terms of the duration of release. This can be achieved for example by the motor of the power tool being switched off. By these measures, the service life of the slip clutch can be advantageously extended considerably. This extension of the service life can be illustrated by the following computational example: if the frequency of the slip clutch release events is constant and the user generally used to stay in the slip clutch phase for 20 s, but the system now already switches off the slip clutch after 10 s, a doubling of the service life of the slip clutch can be achieved for example. The detection of the slip clutch release events and the corresponding limitation of the duration of release is particularly advantageous in the case of power tools that operate or are equipped with an automatic feed, such as an auto feed device. This is in particular because the power tool without slip clutch release event detection possibly stays in the slip clutch phase and cannot respond appropriately to this disturbance.

For the purposes of the invention, it is most particularly preferred that the current values concern the current level of the motor. Alternatively, the current consumption of the motor may also be measured and used as the current value for the purposes of the invention. For the purposes of the invention, it is most particularly preferred to use as current values the measured values that are provided by the motor electronics. These may for example also be power or voltage values that are to be understood as "current values" in the context of the present invention. For example, the power consumption of the motor may be used as the current value for the purposes of the invention. Furthermore, the events of the voltage measurement may also be used for the evaluation in the course of the proposed method. Preferably, the term "current value" for the purposes of the invention describes a value that can be made up from measured values of the current (I), voltage (U) and/or power (P), the current value preferably being provided by the motor electronics.

In the context of the proposed method, the first sensor and the second sensor determine in particular speeds, to be precise preferably the speeds of the gear unit or of the motor. For the purposes of the invention, it is preferred that these speed values concern the numbers of revolutions of the gear unit or of the motor. Consequently, the numbers of revolutions can be used to determine the speeds of the gear unit or of the motor. Furthermore, it may be preferred to use the numbers of revolutions of the gear unit or of the motor directly in order to be taken together with the current values determined by the third sensor as a basis for ascertaining whether a slip clutch release event has taken place. For the purposes of the invention, it is most particularly preferred to use the number of revolutions before and after a slip clutch release event in order to detect whether a slip clutch release event has taken place. These can for example be compared with one another. For example, the numbers of revolutions of the motor of the power tool may be used as the numbers of revolutions. It may however also be preferred to use the numbers of revolutions of a gearwheel driven by the motor in the gear mechanism of the power tool for the evaluation.

Preferably, the numbers of revolutions are sensed in the unit "rounds per minute" (rpm). For example, pulses and times that can subsequently be converted into a number of revolutions in the unit rpm may be measured.

In a further aspect, the invention relates to a power tool, in particular a power core drill, the power tool comprising the following components:
 a motor as a drive for the power tool,
 a control device,
 a gear device,
 a first sensor for sensing a first speed of the gear device,
 a second sensor for sensing a first speed of the motor,
 a third sensor for sensing current values
 and also a slip clutch.

The power tool is characterized in that it is designed to detect a release of the slip clutch by means of the speed and current values that are sensed by the sensors. The definitions, technical effects and advantages that have been described for the proposed method apply to the power tool, and analogously. If the power tool comprises a slip clutch, the state of the power tool may in particular be influenced by whether or not a slip clutch release event has taken place. In particular, the control device of the power tool makes it possible that it can be detected by the proposed power tool that the slip clutch of the power tool has released. For this purpose, preferably the speed and current values that are sensed by the sensors are evaluated in the control device of the core drill. For example, the speed and current values that are determined by the three sensors and are transmitted to the control device may be mathematically offset and/or combined with one another. In addition, the speed and current values may be evaluated with predefined conditions. For this purpose, lookup tables may be used for example. For the purposes of the invention, it is most particularly preferred that the control device of the power tool is designed in particular to detect a state of the power tool or a slip clutch release event by means of the speed and current values that are sensed by the sensors.

For the purposes of the invention, it is preferred that the gear device has multiple gear stages. As a result, it can preferably be ensured that the rotational speeds of the drill bit and the motor have a fixed transmission. This transmission can preferably change, in particular depending on the gear stage that is set. For example, a transmission in a first gear stage may be 1:25. The individual transmission ratios may be stored—for example listed according to the gear stage—in a lookup table. To this extent, lookup tables of the control device can help to detect whether a slip clutch release event has taken place. Preferably, the control device of the core drill is designed to ascertain on the basis of the determined rotational speeds of the motor and the drill bit, by a comparison with a lookup table, whether or not a slip clutch release event has taken place. This may be performed for example by the control device carrying out a comparison of the determined and stored values, and thus ascertaining according to the result of the comparison whether a slip clutch release event has taken place. In other words, the control device of the core drill is designed to ascertain in dependence on the determined rotational speeds of the motor and the drill bit in what state the slip clutch of the drill is, i.e., whether the slip clutch is active or non-active.

For the purposes of the invention, it is preferred that in the context of the proposed invention the ratio between a motor speed and a shaft speed is formed. The determination of this ratio may take place for example in the control device of the power tool. Preferably, the ratio corresponds to the quotient of the motor speed and the shaft speed. For the purposes of the invention, it is preferred to use the ratio between the motor speed and the shaft speed for detecting which gear stage has been selected in the gear device of the power tool. For example, the first gear stage may be assigned to a greater ratio of the motor speed and the shaft speed than the second or third gear stage of the power tool. The values for the ratio of the motor speed and the shaft speed may for example lie in a range from 1 to 100, preferably in a range from 1 to 50 and more preferably in a range from 1 to 30. Preferably, the ratio between the motor speed and the shaft speed corresponds to the transmission of the gear device of the power tool.

It can advantageously be detected by the proposed invention that a gear stage in the gear device of the power tool has been selected and, if a gear stage has been selected, which gear it is. If none of the conditions for one of the gear stages is fulfilled, i.e., if the ratio between the motor speed and the shaft speed or the transmission of the gear mechanism does not correspond to one of the fixed values in the lookup table, this may be an indication that the slip clutch is released or that a slip clutch release event has taken place. This is preferably the case whenever—in addition to the non-fulfillment of a gear stage condition—a current level lies above a previously fixed limit value or offset.

For the purposes of the invention, it is preferred that the power tool comprises a first line, which connects the first sensor to the control device. Furthermore, the power tool comprises a second line, which connects the second sensor to the control device. In addition, the power tool comprises a third line, which connects the third sensor to the control device. In this way, the data sensed by the three sensors can be transmitted without delay to the control device, where they can be evaluated and further processed by means of information technology. In the context of the invention, it is preferred in particular that the number of revolutions of the motor, the number of revolutions of the output shaft of the power tool and the current level of the motor are combined with one another in order to determine the state of the power tool, algorithms and lookup tables being used in particular to define conditions by which a slip clutch release event can be established. If a slip clutch release event is detected, the motor of the power tool may be switched off. In the case where the power tool operates together with an automatic feed device, the proposed method makes it possible to nullify the release of the slip clutch, in that the driving force (feed force) of the automatic feed device is reduced.

Preferably, the power tool may also comprise a data memory for storing the raw or processed data. In this data memory there may preferably also be stored lookup tables, which can preferably be used for evaluation of the data, for example in order to determine the state of the power tool or to ascertain whether a slip clutch of the power tool has released. The data memory may for example be a component part of the control device. For the purposes of the invention, it may also be preferred however that the data memory is arranged at a different location on the power tool. For some applications it may be preferred that the data sensed by the sensors should not be evaluated within the power tool, but that an external evaluation of the speed and current values should take place. Preferably, the power tool may in this case comprise communication means, which make it possible to transmit the sensed and possibly already at least partially evaluated data to an external PC, server, a cloud or some other external data memory or external data processing device. Preferably, for the purposes of the invention, the communication means are also designed to receive the evaluated data, or possibly control commands derived therefrom, for the power tool or for components of the power tool.

A control command may for example be that the motor of the power tool is to be switched off. However, a control command may for example also be that the driving force of the automatic feed device is increased or reduced. Such a control command is preferably sent from the control device to the component of the power tool or to an external device that is intended to perform the command. It may be for example that the external device is the motor of the power tool or the automatic feed device. The transmission of the control command may preferably take place in a wire-bound or wireless manner.

Further advantages of the invention will become apparent from the following description of the figures. Various exemplary embodiments of the present invention are represented in the figures. The figures, the description and the claims contain numerous features in combination. A person skilled in the art will expediently also consider the features individually and combine them to form useful further combinations.

DETAILED DESCRIPTION OF THE DRAWINGS

In the figures, identical and similar components are denoted by the same reference signs.

Figure 1:
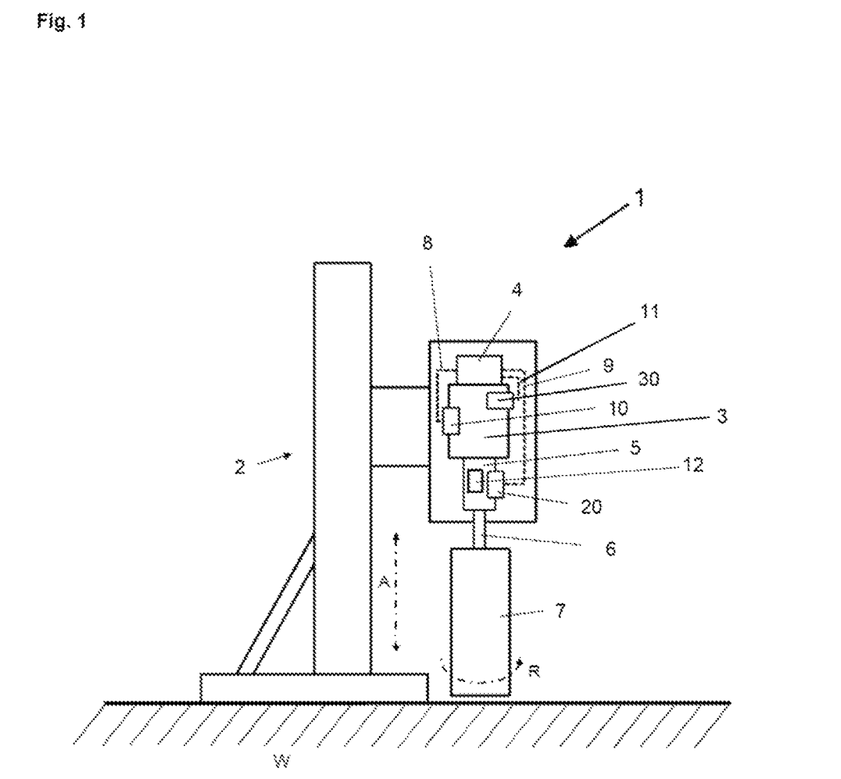
FIG. 1 shows a view of a preferred embodiment of the power tool.

FIG. 1 shows a power tool 1, which is designed as a power core drill and is fastened on a drill stand 2. By means of the drill stand 2, the power tool 1 can be reversibly moved back and forth toward the workpiece W to be worked and away again along the direction of the double-headed arrow A. The material W is for example concrete or a slab of concrete.

The power tool 1 includes a motor 3, a control device 4, a gear device 5, an output shaft 6, a tool 7 designed as a drill bit, a first sensor 10 for sensing a first speed of the gear device 5 and a second sensor 20 for sensing a first speed of the motor 3 and a third sensor 30 for sensing currents. Any kind of electric motor may be used as the motor 3.

The motor 3 is designed in particular as an electric motor and serves for driving the tool 7 of the power tool 1. In particular, it may be a drill bit 7. The motor 3 may include a drive shaft, which is releasably connected to the gear device 5. The connection may take the form of a clutch. By means of the gear device 5 and the output shaft 6, the drill bit 7 is set in a rotational motion. The torque generated in the motor 3 is thereby transmitted correspondingly to the drill bit 7, in order to cut a borehole into the material W.

The gear device 5 is preferably positioned between the drive shaft of the motor 3 and the output shaft 6. The first sensor 10 is positioned on the gear device 5 such that a first speed of the gear device 5 can be sensed. The second sensor 20 is preferably positioned such that a first speed of the motor 3 can be sensed. The third sensor 30 is preferably positioned such that current values of the motor 3 can be sensed.

The control device 4 is connected by way of a first line 8 to the first sensor 10, by way of a second line 9 to the second sensor 20 and by way of a third line 11 to the third sensor 30 such that the speed and current values measured by the sensors 10, 20, 30 can be transmitted to the control device 4. In addition, the control device 4 is connected to the motor 3 such that the control device 4 can directly vary the rotational speed or the speed of the motor 3. The control device 4 may preferably comprise a data memory, in which lookup tables (transmission tables) may be stored. By using these lookup tables or by using algorithms, a state of the power tool 1 can be determined, the speed and current values that are measured by the sensors 10, 20, 30 being taken in particular as a basis for determining the state. For the purposes of the invention, this determination of the state is preferably also referred to as evaluation of the data sensed by the sensors 10, 20, 30. For the purposes of the invention, it is most particularly preferred that the state of the power tool 1 is determined by using the lookup table, which contain speed ratios and current values. The evaluation of the data preferably takes place in the control unit 4 of the power tool 1. The evaluation may for example comprise looking up values in the lookup tables, and also using mathematical algorithms, comparing data or combining values. For example, state values or variables that characterize the state of the power tool 1 may be calculated. These state values may for example be compared with limit or threshold values that are stored in the lookup tables.

Figure 2:
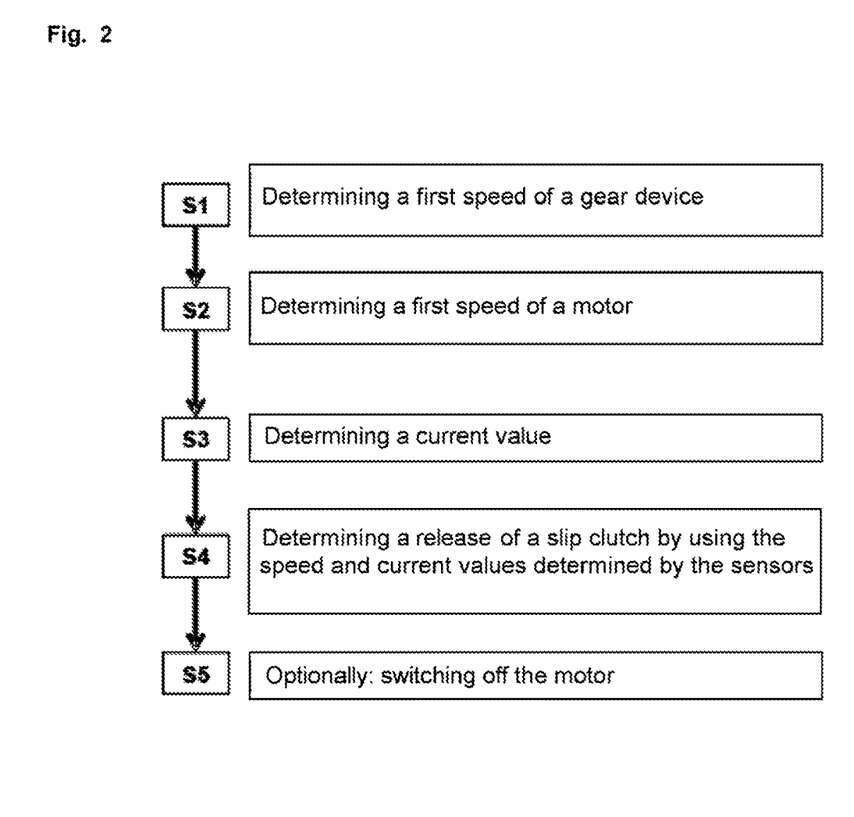
FIG. 2 shows a representation of a possible design of the proposed method.

FIG. 2 shows by way of example a possible sequence of the proposed method.

For this purpose, in step S1, first a first speed of the gear device 5 is determined by the first sensor 10.

In step S2, a first speed of the motor 3 is determined by the second sensor 20.

In step S3, current values of the motor 3 are determined by the third sensor 30.

In step S4, a state of the power tool 1 is determined by using the speeds and current values sensed by the sensors 10,

20, 30. The state of the power tool 1 may be influenced for example by a release of the slip clutch 12. In other words, the speed and current values sensed by the sensors 10, 20, 30 may be used by evaluating the values to ascertain whether or not a slip clutch 12 in a power tool 1 has released.

In the optional step S5, depending on the state determined, the motor 3 of the power tool 1 is switched off or the power tool 1 continues to be operated. For example, in some applications it may be preferred to switch off the power tool 1 if a release of the slip clutch 12 of the power tool has been ascertained 1. To this extent, method step S5 represents an optional method step, which is performed in particular whenever switching off of the motor 3 appears to be required or advisable in view of the determined state of the power tool (method step S4). This may be the case in particular in the case of a slip clutch release event. The measure of the assessment for switching off the motor may be combinations of speed and current values that are stored in the lookup tables. However, calculations, comparisons of values or combinations of data may also be used to determine whether the motor 3 of the power tool 1 should be switched off, for example whenever the slip clutch 12 of the power tool 1 has released.

Figure 3:
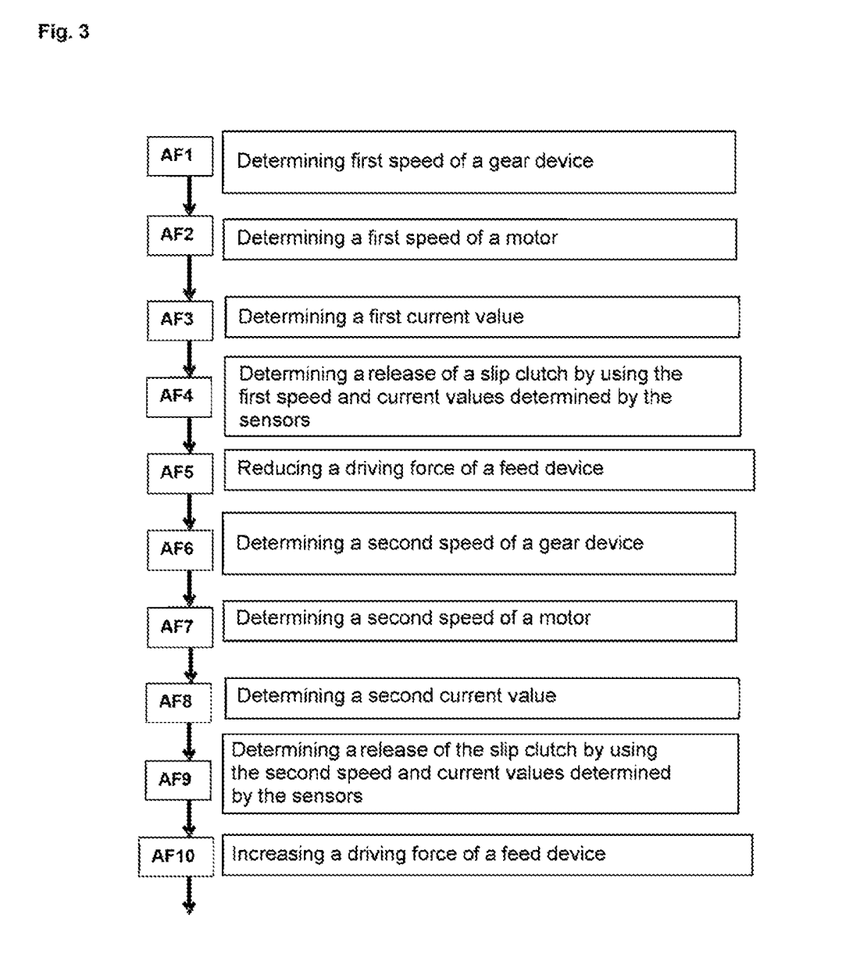
FIG. 3 shows a representation of a possible design of the proposed method when the power tool operates together with an automatic feed device.

FIG. 3 shows by way of example a possible sequence of the proposed method when the power tool 1 operates together with an automatic feed device ("auto feed"). Here, the first method steps AF1 to AF4 proceed substantially analogously to the method represented in FIG. 2, in particular method steps S1 to S4.

In a method step AF5, a driving force of the automatic feed device is reduced. This reduction of the driving force of the automatic auto feed device may take place for example in dependence on the state of the power tool 1 determined in step AF4 or in dependence on the speed and current values determined by the sensors 10, 20, 30 in steps AF1 to AF3. For the purposes of the invention, it is most particularly preferred that the driving force of the automatic feed device is reduced in response to a slip clutch release event being detected—for example in method step AF4.

In steps AF6 to AF8, second speed and current values are then determined by the sensors 10, 20, 30. These second speed and current values are determined in particular during the operation of the power tool 1 with the reduced driving force of the automatic feed device. For the purposes of the invention, it is preferred that, with the second speed and current values, a state of the power tool 1 in which for example drilling is continued is detected. This takes place in particular whenever the system comprising the power tool 1 has responded to the slip clutch release event and the conditions that led to the release of the slip clutch 12 have changed.

In particular, a second speed of the gear device 5 is sensed in method step AF6 by the first sensor 10. In method step AF7, a second speed value of the motor 30 is sensed by the second sensor 20, while in AF8 a second current value is determined by the third sensor 30. The second speed and current values thus determined can be transmitted by the sensors 10, 20, 30 to the control device 4, the first line 8, the second line 9 and the third line 11 preferably being used for this. With the control device 4, the data sensed by the sensors 10, 20, 30 can be evaluated.

In particular, in method step AF9 a second state of the power tool 1 can be determined, to be precise using the second speed and current values transmitted by the sensors 10, 20, 30. This second state preferably describes the state of the power tool 1 when the automatic feed device is operating with reduced driving force. A change of the state of the power tool 1 may occur for example due to a release event of the slip clutch 12 of the power tool 1.

In method step AF10, the driving force of the automatic feed device may be increased, preferably in dependence on the second state of the power tool 1 determined in step AF9.

LIST OF REFERENCE CHARACTERS

1 Power tool, for example a power core drill
2 Drill stand
3 Motor
4 Control device
5 Gear device
6 Drive shaft
7 Tool for the power tool, for example a drill bit
8 First line
9 Second line
10 First sensor
11 Third line
12 Slip clutch
20 Second sensor
30 Third sensor

The invention claimed is:

1. A method for detecting whether a slip clutch release event has taken place in a power tool (1), the power tool (1) comprising:
a motor (3) as a drive for the power tool (1);
a control device (4);
a gear device (5);
a first sensor (10) for sensing a first speed of the gear device (5);
a second sensor (20) for sensing a second speed of the motor (3);
a third sensor (30) for sensing a current value; and
a slip clutch (12);
and comprising the steps of:
a) determining the first speed of the gear device (5) by the first sensor (10);
b) determining the second speed of the motor (3) by the second sensor (20);
c) determining the current value by the third sensor (30);
d) determining a state of the power tool (1) by using the first and second speeds and the current value;
e) determining a state of the gear device (5) in dependence on the current value by the control device;
f) ascertaining a state of activity of the slip clutch (12) in dependence on the first and second speeds by the control device; and
g) ascertaining by the control device by a combination of the state of the gear device (5) and the state of activity of the slip clutch (12) whether the slip clutch release event has taken place.

2. The method as claimed in claim 1, wherein the control device (4) forms a ratio between a speed of the motor (3) and a speed of an output shaft (6) of the power tool (1) and wherein the ratio is used to detect a gear stage of the gear device (5).

3. The method as claimed in claim 1, wherein the motor (3) of the power tool (1) is switched off when the slip clutch release event has taken place.

4. A power tool (1), comprising:
a motor (3) as a drive for the power tool (1);
a control device (4);
a gear device (5);
a first sensor (10);
a second sensor (20);
a third sensor (30); and a slip clutch (12);

wherein the control device (4) is configured to:
- a) determine a state of the gear device (5) in dependence on a current value sensed by the third sensor (30);
- b) ascertain a state of activity of the slip clutch (12) in dependence on a first speed of the gear device (5) sensed by the first sensor (10) and a second speed of the motor (3) sensed by the second sensor (20); and
- c) ascertain by a combination of the state of the gear device (5) and the state of activity of the slip clutch (12) whether a slip clutch release event has taken place.

5. The power tool (1) as claimed in claim 4, further comprising a first line (8) which connects the first sensor (10) to the control device (4).

6. The power tool (1) as claimed in claim 5, further comprising a second line (9) which connects the second sensor (20) to the control device (4).

7. The power tool (1) as claimed in claim 6, further comprising a third line (11) which connects the third sensor (30) to the control device (4).

\* \* \* \* \*